(12) United States Patent
Albrecht et al.

(10) Patent No.: US 11,019,468 B2
(45) Date of Patent: May 25, 2021

(54) GROUP COMMUNICATION FORWARDING TO A SECONDARY SERVICE

(71) Applicant: Orion Labs, San Francisco, CA (US)

(72) Inventors: Greg Albrecht, San Francisco, CA (US); Ellen Juhlin, San Francisco, CA (US)

(73) Assignee: Orion Labs, Inc., San Francisco, CA (US)

(*) Notice: Subject to any disclaimer, the term of this patent is extended or adjusted under 35 U.S.C. 154(b) by 0 days.

(21) Appl. No.: 16/665,930

(22) Filed: Oct. 28, 2019

(65) Prior Publication Data

US 2020/0162861 A1 May 21, 2020

Related U.S. Application Data

(63) Continuation of application No. 15/729,835, filed on Oct. 11, 2017, now Pat. No. 10,462,620.

(Continued)

(51) Int. Cl.
*H04W 4/08* (2009.01)
*H04W 8/24* (2009.01)
(Continued)

(52) U.S. Cl.
CPC .............. *H04W 4/16* (2013.01); *H04M 3/58* (2013.01); *H04M 7/006* (2013.01); *H04W 4/08* (2013.01);
(Continued)

(58) Field of Classification Search
CPC ........... H04W 4/08; H04W 8/24; H04W 4/16; H04W 4/10; H04M 7/006
See application file for complete search history.

(56) References Cited

U.S. PATENT DOCUMENTS 6,021,326 A    2/2000   Nguyen
6,195,415 B1    2/2001   Shimoda et al.
(Continued)

FOREIGN PATENT DOCUMENTS

WO    WO2016069991 A1 * 1/2014

OTHER PUBLICATIONS

National security and Emergency Preparedness communications: Next generation priority services by David Nolan; Stan Wainberg; John R. Wullert; Arye R. Ephrath Published in: 2013 IEEE International Conference on Technologies for Homeland Security (HST), Jan. 2014 (Year: 2014).*

(Continued)

*Primary Examiner* — William D Cumming

(57) ABSTRACT

Systems, methods, and software described herein provide enhancements for a voice communication service to forward communications to a secondary service. In one implementation, a method of operating a group communication service that facilitates voice communications for a group of end user devices includes exchanging voice communications between the group of end user devices, wherein the group of end user devices comprises a first end user device and at least one secondary end user device. The method further provides identifying, in a voice communication from the first end user device, a use of a key phrase and, in response to identifying the key phrase, forwarding at least a portion of the voice communication to a second service.

20 Claims, 7 Drawing Sheets

Related U.S. Application Data

(60) Provisional application No. 62/406,795, filed on Oct. 11, 2016.

(51) Int. Cl.
*H04W 4/16* (2009.01)
*H04M 7/00* (2006.01)
*H04M 3/58* (2006.01)
*H04M 3/54* (2006.01)

(52) U.S. Cl.
CPC .......... *H04M 3/54* (2013.01); *H04M 2201/18* (2013.01); *H04M 2203/2044* (2013.01); *H04M 2203/357* (2013.01)

(56) References Cited

U.S. PATENT DOCUMENTS

| | | | |
|---|---|---|---|
| 6,272,334 B1 | 8/2001 | Rao | |
| 6,295,284 B1 | 9/2001 | Maggenti | |
| 6,301,263 B1 | 10/2001 | Maggenti | |
| 8,032,383 B1 | 10/2011 | Bhardwaj et al. | |
| 8,135,589 B1 | 3/2012 | Reding et al. | |
| 8,457,971 B2 | 6/2013 | Scott et al. | |
| 8,498,865 B1 | 7/2013 | Shostak | |
| 9,727,666 B2* | 8/2017 | Schimmelpfeng | G06F 16/243 |
| 9,936,010 B1* | 4/2018 | Robbins | H04B 1/385 |
| 10,319,471 B2* | 6/2019 | Firminger | G16H 10/60 |
| 10,462,620 B2* | 10/2019 | Albrecht | H04M 7/006 |
| 10,515,629 B2* | 12/2019 | Harper | G10L 25/51 |
| 2002/0102999 A1 | 8/2002 | Maggenti et al. | |
| 2003/0204445 A1* | 10/2003 | Vishik | G06Q 20/10 705/26.42 |
| 2005/0239487 A1 | 10/2005 | Glass et al. | |
| 2006/0235981 A1 | 10/2006 | Westman et al. | |
| 2008/0167022 A1 | 7/2008 | Lee et al. | |
| 2010/0182631 A1 | 7/2010 | King et al. | |
| 2010/0246784 A1 | 9/2010 | Frazier et al. | |
| 2011/0195659 A1 | 8/2011 | Boll et al. | |
| 2012/0151380 A1 | 6/2012 | Bishop | |
| 2012/0179982 A1 | 7/2012 | Gandhi et al. | |
| 2012/0297277 A1 | 11/2012 | King et al. | |
| 2013/0029599 A1 | 1/2013 | Santori et al. | |
| 2013/0150150 A1 | 6/2013 | Allen et al. | |
| 2013/0151622 A1 | 6/2013 | Goel et al. | |
| 2015/0317355 A1* | 11/2015 | Schimmelpfeng | G06F 11/079 707/722 |
| 2017/0249679 A1* | 8/2017 | George | G06Q 30/0611 |
| 2017/0251343 A1* | 8/2017 | Robbins | H04W 4/08 |
| 2018/0103359 A1* | 4/2018 | Albrecht | H04M 3/58 |
| 2018/0166157 A1* | 6/2018 | Firminger | G16H 10/60 |
| 2018/0197636 A1* | 7/2018 | Firminger | A61B 5/0022 |
| 2018/0254041 A1* | 9/2018 | Harper | G16H 40/67 |
| 2018/0255437 A1* | 9/2018 | Robbins | H04W 8/24 |
| 2018/0278555 A1* | 9/2018 | Robbins | H04L 51/02 |
| 2018/0278557 A1* | 9/2018 | Robbins | H04L 51/02 |
| 2019/0104094 A1* | 4/2019 | Albrecht | G10L 15/22 |
| 2020/0126542 A1* | 4/2020 | Harper | G10L 15/1815 |

OTHER PUBLICATIONS

PCT/US17/056096, "Notification of Transmittal of the International Search Report and the Written Opinion of the International Searching Authority", dated Dec. 26, 2017, 7 pages.

* cited by examiner

GROUP COMMUNICATION FORWARDING TO A SECONDARY SERVICE

RELATED APPLICATIONS

This application hereby claims the benefit of and priority to U.S. patent application Ser. No. 15/729,835, entitled "GROUP COMMUNICATION FORWARDING TO A SECONDARY SERVICE", filed on Oct. 11, 2017, and to U.S. Provisional Patent Application No. 62/406,795, titled "GROUP COMMUNICATION FORWARDING TO A SECONDARY SERVICE," filed Oct. 11, 2016, which is hereby incorporated by reference in its entirety.

TECHNICAL BACKGROUND

Telephones, computers, and tablets provide an efficient way for users to communicate without being in the same physical location. However, these devices often require the user to provide multiple inputs and preferences for each of the communications before the communications can take place. Such preferences may include the individuals involved in the communication, a contact identifier for the individuals in the communication, amongst a variety of other preferences. Moreover, when busy performing other tasks, it is often obtrusive to hold a telephone, computer, or tablet to make the communication, and takes focus away from the current task.

In some implementations, in addition to a communication application that can provide communications between a plurality of communication devices, a communication device may include other applications that provide various other services to the end user. These services may include, but are not limited to, shopping services, concierge services, and food ordering services. However, switching between applications to select the desired service can cumbersome, and can provide further difficulty when members of a communication desire operations on the same service.

Overview

Provided herein are enhancements for voice communications between a plurality of end users. In one implementation, a method of operating a group communication service that facilitates voice communications for a group of end user devices includes exchanging voice communications between the group of end user devices, wherein the group comprises a first end user device and at least one secondary end user device. The method further provides identifying, in a voice communication from the first end user device, a use of a key phrase, and in response to identifying the key phrase, forwarding at least a portion of the voice communication to a second service.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
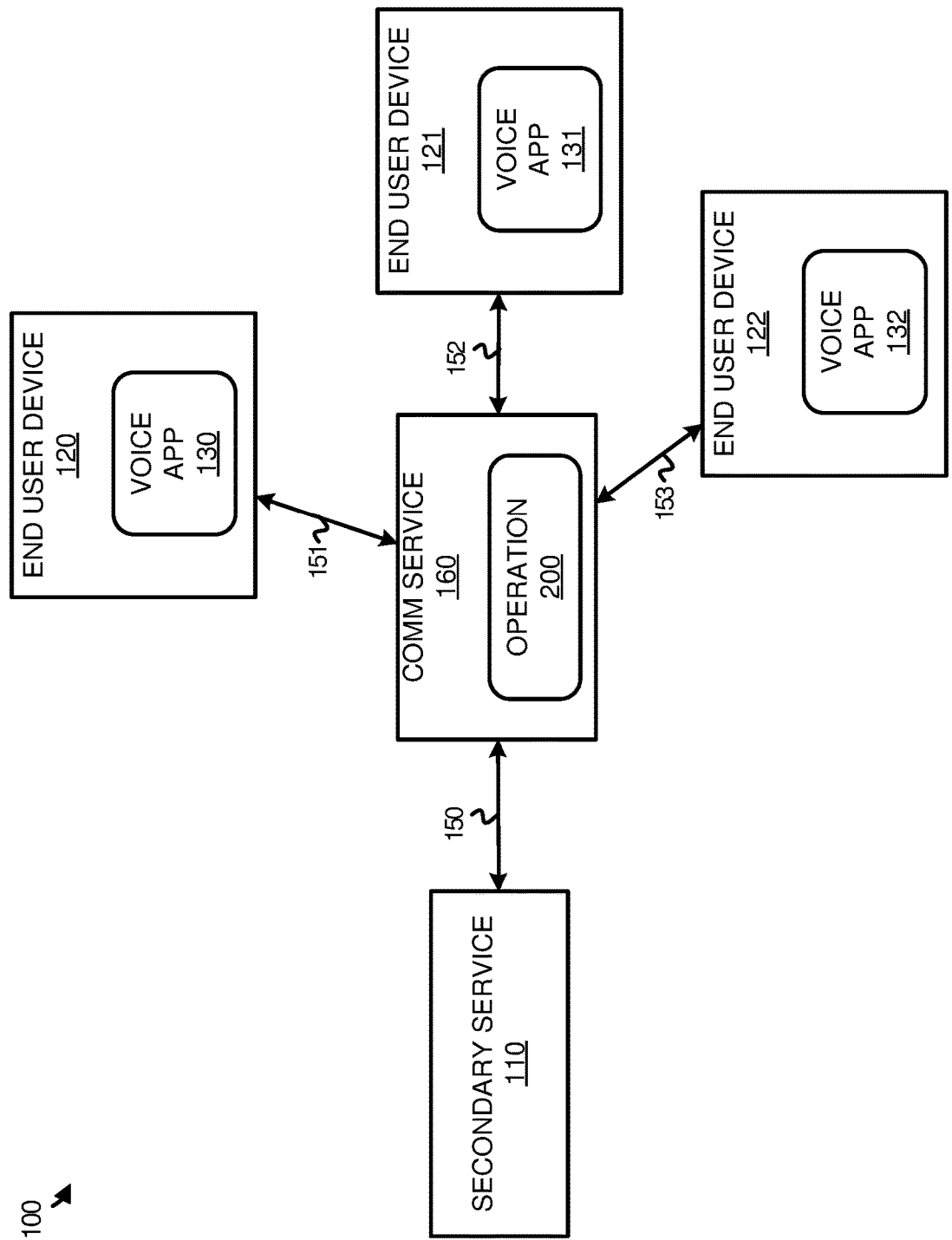
FIG. 1 illustrates a communication system for group communications according to one implementation.

FIG. 1 illustrates a communication system 100 for group communications according to one implementation. Communication system 100 includes end user devices 120-122, communication service 160, and secondary service 110. Communication service 160 communicates with secondary service 110 using communication link 150, and further communicates with end user devices 120-122 using communication links 151-153. End user devices 120-122 can be wireless communication devices, or in some examples wired communication devices, capable of executing voice application 130-132 to provide communication services with other end user devices. Communication service 160 executes operation 200 to provide voice communication forwarding operations with secondary service 110. In some implementations, secondary service 110 comprises a personal assistant, food ordering, or shopping service, and may be associated with a secondary application that can be executed on end user devices 120-122.

In operation, end user devices 120-122 execute voice applications 130-132 to communicate with other end user devices. In some implementations, each of the users at end user devices 120-122 may be associated with one or more communication groups, permitting the users to communicate with other users that belong to the same group. For example, in communication system 100, end user devices 120-122 may belong to the same communication group, permitting users of end user devices 120-122 to communicate with one another via communication service 160. Although one communication group is included in the example of FIG. 1, it should be understood that any number of communication groups may operate via communication service 160.

In some implementations, in conjunction with voice applications 130-132, each end user device in end user devices 120-122 may be wirelessly coupled to a cooperating device. This device may communicate with the end user device using Bluetooth or some other close proximity wireless signaling. Consequently, rather than using the end user device for a communication, a user of an end user device may transmit and receive voice communications using the cooperating device, wherein the cooperating device couples to the voice application and to transmit and receive the desired communications with communication service 160.

Figure 2:
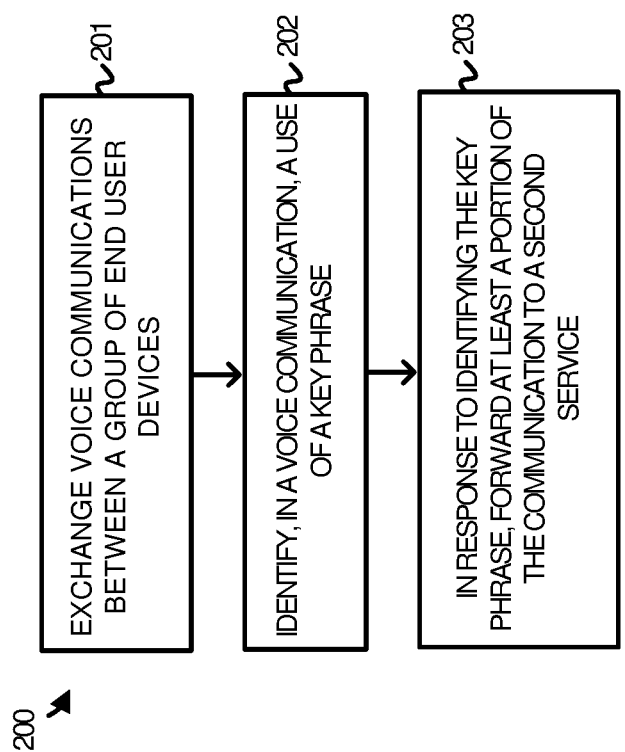
FIG. 2 illustrates an operation to forward communications from a group communication service to a second service according to one implementation.

To further demonstrate the operations of FIG. 1, FIG. 2 is provided. FIG. 2 illustrates an operation 200 to forward communications from a group communication service to a second service according to one implementation. The processes of operation 200 are referenced parenthetically in the paragraphs that follow, along with references to the elements and systems from computing system 100 of FIG. 1.

As illustrated in FIG. 2, operation 200, which executes on communication service 160, exchanges (201) voice communications between a group of end user devices 120-122. In some examples, these communications may comprise push-to-talk (PTT) communications wherein a user of an end user device may use a toggle, button, switch, or some other user interface element to transition from receiving to transmitting mode. Once a voice communication is received by an end user device using the PTT element, the communication may be transferred over communication service 160 to other users that belong to the associated group. Accordingly, when a communication is transferred by a user of end user device 120 to communicate with other members of the group, the voice communication is transferred over communication service 160 to end user devices 121-122, wherein the voice communication may be produced for the users at the devices.

As described previously, in some implementations, in conjunction with voice applications 130-132 on the end user devices, cooperating devices may be used to transmit and receive the communications for the communication group. These cooperating devices, which may comprise wearable devices in some examples, can include a microphone, a speaker, a transmitter/receiver (such as a Bluetooth transmitter/receiver to communicate with an associated end user device), as well as a user interface element to transition from receiving to transmitting mode. Accordingly, referring to the example transmission from end user device 120, the user of end user device 120 may use a cooperating device wirelessly linked to end user device 120 to initiate an outgoing communication. Voice application 130 will identify the communication from the cooperating device and forward the communication over communication service 160 to end user devices 121-122. Once received, voice applications 130-131 may communicate the voice communication to associated cooperating devices, wherein the devices may play the voice communication for users associated with end user devices 121-122.

During the voice communications for end user devices 120-122, communication service 160 identifies (202), in a voice communication from a first end user device in end user devices 120-122, a use of a key phrase, wherein the key phrase may comprise one or more words or sounds defined to provide an action in association with a second service. As a result, in response to identifying the key phrase, communication service 160 forwards (203) at least a portion of a communication to a second service. For example, a user of voice application 130 may use the name of secondary service 110 to invoke an operation of the service, such as "hello secondary service." In response to identifying these terms, in some examples using natural language processing, communication service 160 may forward the communication to secondary service 110 for further processing. Thus, if secondary service 110 comprised a personal assistant service, secondary service 110 may be used to create a calendar reminder or some other operation based on the information provided in the voice communication.

In some implementations, the voice communication identified with the key phrase may be targeted at using the secondary service for the individual user that was the source of the voice communication. Thus, referring again to the example of a communication from end user device 120, communication service 160 may forward the communication to secondary service 110 with an identifier for a user of end user device 120. This identifier may comprise a username, a user number, or some other similar user identifier. As a result, when the communication is received at secondary service 110, the service may be able to identify the user and/or device that was the source of the voice communication. In some examples, when it is identified that the request is associated with an individual user or a smaller subset of users than the entire group, communication service 160 may be used to prevent the communication from proceeding to other end user devices within the group. This permits a user to make an individual request to secondary service 110 without leaving the voice application used in the communication with the group.

In some examples, in addition to identifying that a voice communication relates to an individual user, communication service 160 may also identify when a request is associated with the group of users for the communication. This identification allows communication service 160 to identify a request to the secondary service, and provide an identifier for the group in the communication that is transferred to the secondary service. Referring to the example in FIG. 1, if end user device 120 transfers a voice communication that provides a key phrase indicative of a request to the secondary service along with an identifier that the request is associated with the group of end user devices 120-122, then communication service 150 may forward the communication to secondary service 110 with an identifier for the group making the request, as opposed to the individual making the request. For example, end user device 120 may initiate a request to update a calendar for the entire group of end user devices as opposed to the calendar for just end user device 120. In some implementations, when a request is identified as a group request for secondary service 110, the voice communication may be forwarded to other users in the communication group. Thus, in some examples, when a request in a voice communication is for an individual user, the voice communication may fail to be forwarded to other users in the group. In contrast, if a voice communication indicates a request for a group to the second service, the communication may also be forwarded to other members of the group, permitting the members of the group to listen to the communication.

Figure 3:
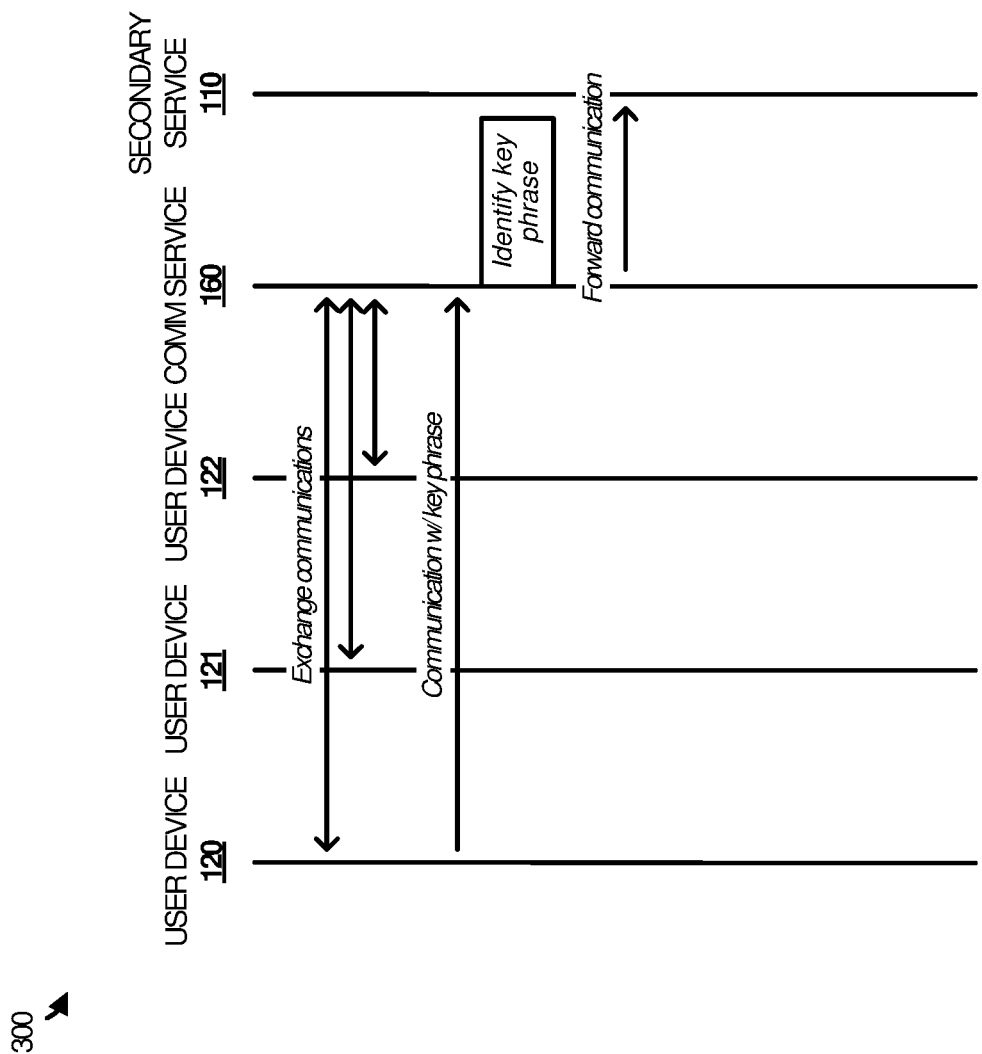
FIG. 3 illustrates a timing diagram to forward communications from a group communication service to a second service according to one implementation.

FIG. 3 illustrates a timing diagram 300 to forward communications from a group communication service to a second service according to one implementation. Timing diagram 300 includes systems and elements from communication system 100 of FIG. 1.

As depicted in timing diagram 300, end user devices 120-122, which can correspond to wireless communication devices in some implementations, exchange voice communications with one another via communication service 160. In some implementations, the devices that are used to receive and transmit the audio communications may include end user devices 120-122 themselves, however, it should be understood that a wirelessly coupled cooperating device, such as a wearable device, may be used to receive and broadcast voice communications to the users of the devices. During the communications over communication service 160, user device 120 may transfer a communication with a key phrase. This key phrase may include a single word, name, a phrase, or any other combination of verbal elements associated with a secondary service.

In response to sending the voice communication with the key phrase, communication service 160 is configured to identify the key phrase and forward the voice communication to secondary service 110. For example, the key phrase may be used to call secondary service 110, which may comprise a calendar application. Consequently, once the key phrase is identified, the request for the calendar application may be forwarded to secondary services 110. This permits a user at user device 120 to execute an action with a separate service without leaving the current application.

In some implementations, communication service 160 may be configured to identify whether the key phrase invokes a request for a single user associated with user device 120, or for a group of users, such as user devices 120-122. In particular, if the key phrase indicates a request for a user associated with user device 120, then an identifier may be associated with the voice communication before it is provided to secondary service 110. This would permit secondary service 110 to distinguish or identify the user that is making the request to the service. In contrast, if the key phrase indicates a request for a group of users, such as for all users of user devices 120-122, then communication service 160 may associate a group identifier with the voice communication and provide the voice communication to secondary service 110. Thus, instead of associating the voice communication from user device 120 with just the users profile, the secondary service may be able to identify that the communication is to be associated with a group profile. For example, returning to the calendar request provided above, a voice communication may indicate a request to update the calendar for all user devices 120-122 in the group. Thus, when the voice communication is forwarded to secondary service 110, a group identifier may be used to identify the devices/users associated with the request.

In some examples, in identifying whether the voice communication with the key phrase is associated with an individual user or the group of users, communication service 160 may forward the communication to other devices based on whether the communication is for the individual or the group. In particular, communication service 160 may prevent the voice communication associated with the key from being provided to user device 121-122 when the communication only involves user device 120. However, if the communication is in regards to the group, communication service 160 may forward the communication to user devices 121-122.

In some implementations, communication service 160 may also be configured to receive a response from secondary service 110. This response may include a verification that the voice communication provided a particular operation, a secondary follow-up question for the user making the request, or some other similar response. Accordingly, communication service 160 may be configured to direct the response to appropriated end user devices in end user devices 120. In some implementations, when the request from a particular end user device corresponds to an individual inquiry to secondary service 160, communication service 160 may only provide responses from secondary service 110 to the requesting end user device. In contrast, if a request corresponds to the group, communication service 160 may forward any return communication to all of the end user devices.

Figure 4:
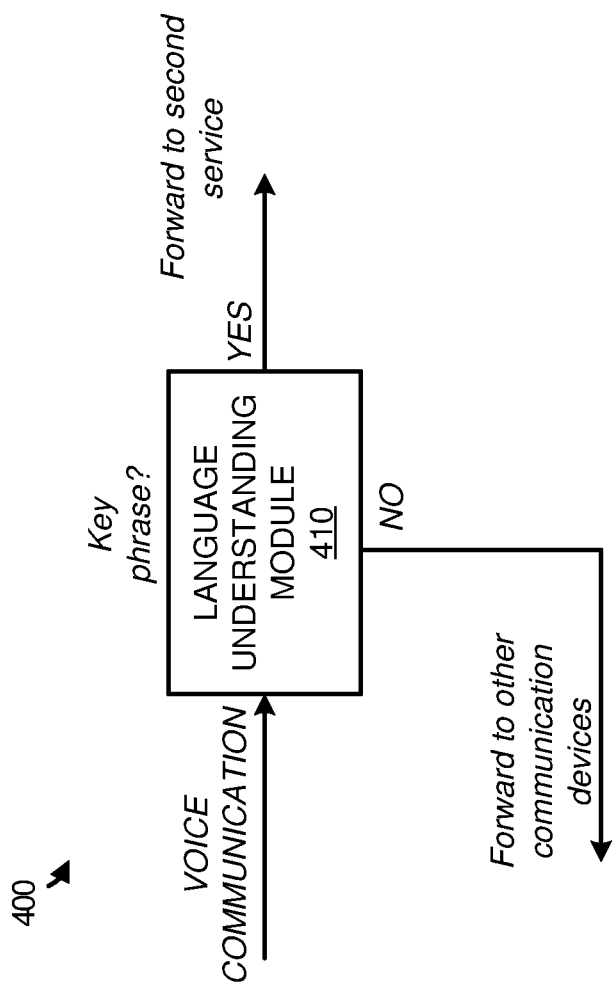
FIG. 4 illustrates an operational scenario of identifying communications with key phrases according to one implementation.

FIG. 4 illustrates an operational scenario 400 of identifying communications with key phrases according to one implementation. Operational scenario 400 includes operations of language understanding module 410, which can be implemented by a communication service, wherein the communication service is responsible for connecting and providing end user devices with voice communications with defined groups. In some examples, these voice communications may comprise PTT communications, which permits each of the users to select, via a user interface element, whether they are in transmit or receive mode for voice communications. Operational scenario 400 is an example operation taken for a single voice communication, however, it should be understood that the operation may be repeated for each voice communication received from a user communication device.

Here, language understanding module 410 receives a voice communication from an end user device involved in a voice communication with a group of other end user devices. In response to receiving the message, a determination is made by language understanding module 410 about whether the communication includes a key phrase. For example, a key phrase may include a name for the service. Accordingly, if a name of the service is identified by language understanding module 410, then any voice data that is provided subsequent to the name in the communication may be forwarded to the second service. In an alternative example, if the voice communication is not found to include the key phrase, then the communication may be routed to other end user devices in the communication group.

In at least one implementation, when it is found that a communication should be forwarded to the second service, language understanding module 410 may prevent at least a portion of the communication from being provided to other user devices in the communication group. Thus, once language understanding module 410 identifies the name or identifier to call the second service, then the remaining portion of the voice communication may be prevented from going to other devices. However, in other implementations, the communication may continue to be routed to other devices when the key phrase is identified in the communication.

Figure 5:
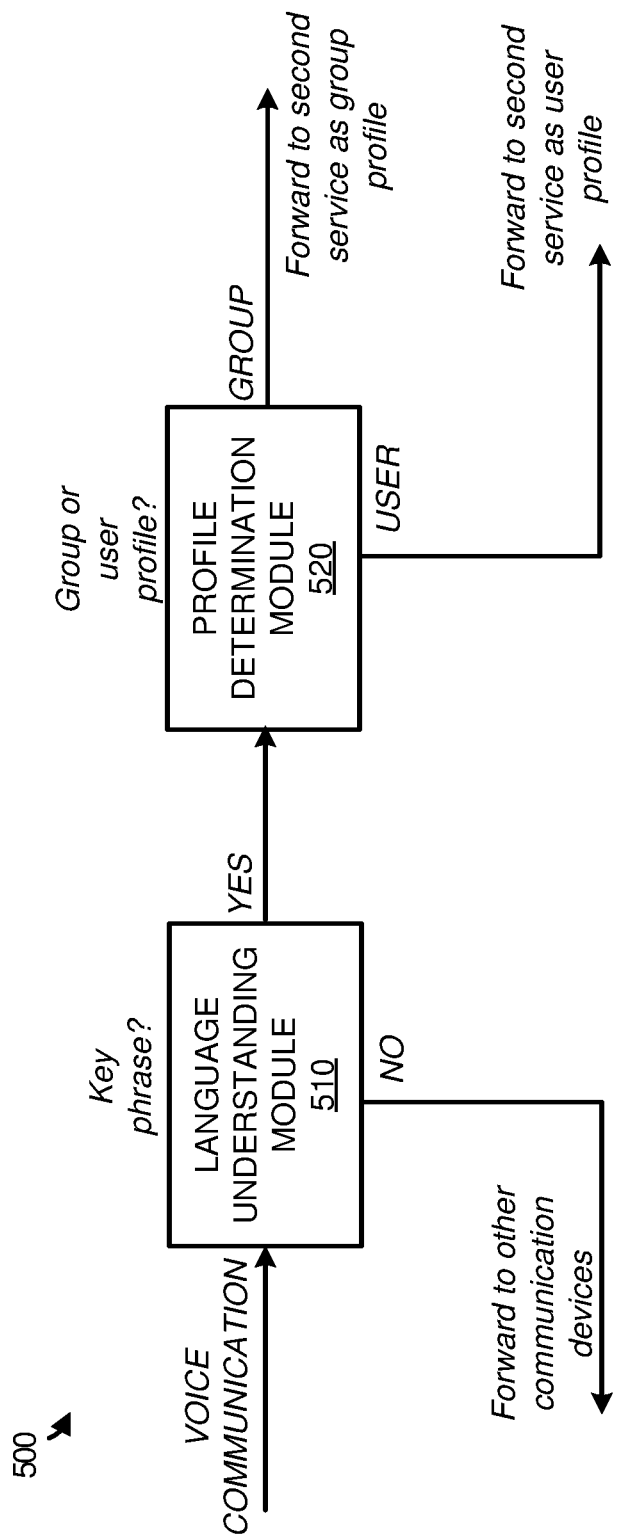
FIG. 5 illustrates an operational scenario of identifying communications with key phrases according to one implementation.

FIG. 5 illustrates an operational scenario 500 of identifying communications with key phrases according to one implementation. Operational scenario 500 includes operations of language understanding module 510 and profile determination module 520, which are representative of operations to be provided by a communication service. This communication service is responsible for connecting and providing end user devices with voice communications with defined groups. In some examples, these voice communications may comprise PTT communications, which permits each of the users to select, via a user interface element, whether they are in transmit or receive mode for voice communications. Operational scenario 500 is an example operation taken for a single voice communication, however, it should be understood that the operation may be repeated for each voice communication received from a user communication device in a communication group.

Similar to the operations described in operational scenario 400 of FIG. 4, language understanding module 510 receives a voice communication from an end user device involved in a voice communication with a group of other end user devices. In response to receiving the message, a determination is made by language understanding module 410 about whether the communication includes a key phrase. For example, a key phrase may include a name for the service. Accordingly, if a name of the service is identified by language understanding module 510, then any voice data that is provided subsequent to the name in the communication may be forwarded to the second service. In an alternative example, if the voice communication is not found to include the key phrase, then the communication may be routed to other end user devices in the communication group.

If the communication does include a key phrase, profile determination module 520 may determine if the key phrase corresponds to a user profile or a group profile based on the contents of the voice communication. For example, the user may provide a first portion of a key phrase, which defines that the communication is associated with the second service, and the user may provide a second portion of the key phrase, which defines whether the request is associated with the single user's profile or the group profile. If the communication is for the specific user, then an identifier may be included for the particular user or user device and forwarded to the second service with the identifier. In contrast, if the communication were for a group of users, then an identifier may be included for the group profile and forwarded to the second service with the identifier for the group. This operation ensures that the second service is able to identify the source, either individual or group, associated with a particular request.

In some implementations, based on whether the communication is associated with an individual or a group, profile determination module 520 may be responsible for forwarding or preventing communications from being forwarded to other devices within a group communication. Accordingly, if the voice communication corresponded to an individual profile request to the second service, then profile determination module 520 may prevent the communication from being forwarded to other devices within the communication group. For example, if an end user device transfers a communication that includes a vocal communication in the following format, "service A, individual, CONTENT OF REQUEST," the communication service would identify that the user device is requesting service A as an individual, and may prevent the CONTENT OF REQUEST in the vocal communication from being provided to other devices on the voice communication.

In other implementations, when the request from an end user device corresponds to a group profile, the communication service and profile determination module 520 may be used to forward the communication to other users in the same group, or in some cases sub-group. For example, if an end user device transfers a communication that includes a vocal communication in the following format, "service A, group A, CONTENT OF REQUEST," the communication service would identify that the user device is requesting service A as a group, and may forward the CONTENT OF REQUEST only to members of group A. In some examples, group A may include all of the members that are in a communication group, however, it should be understood that group A may also comprise a subset of the overall group.

Figure 6:
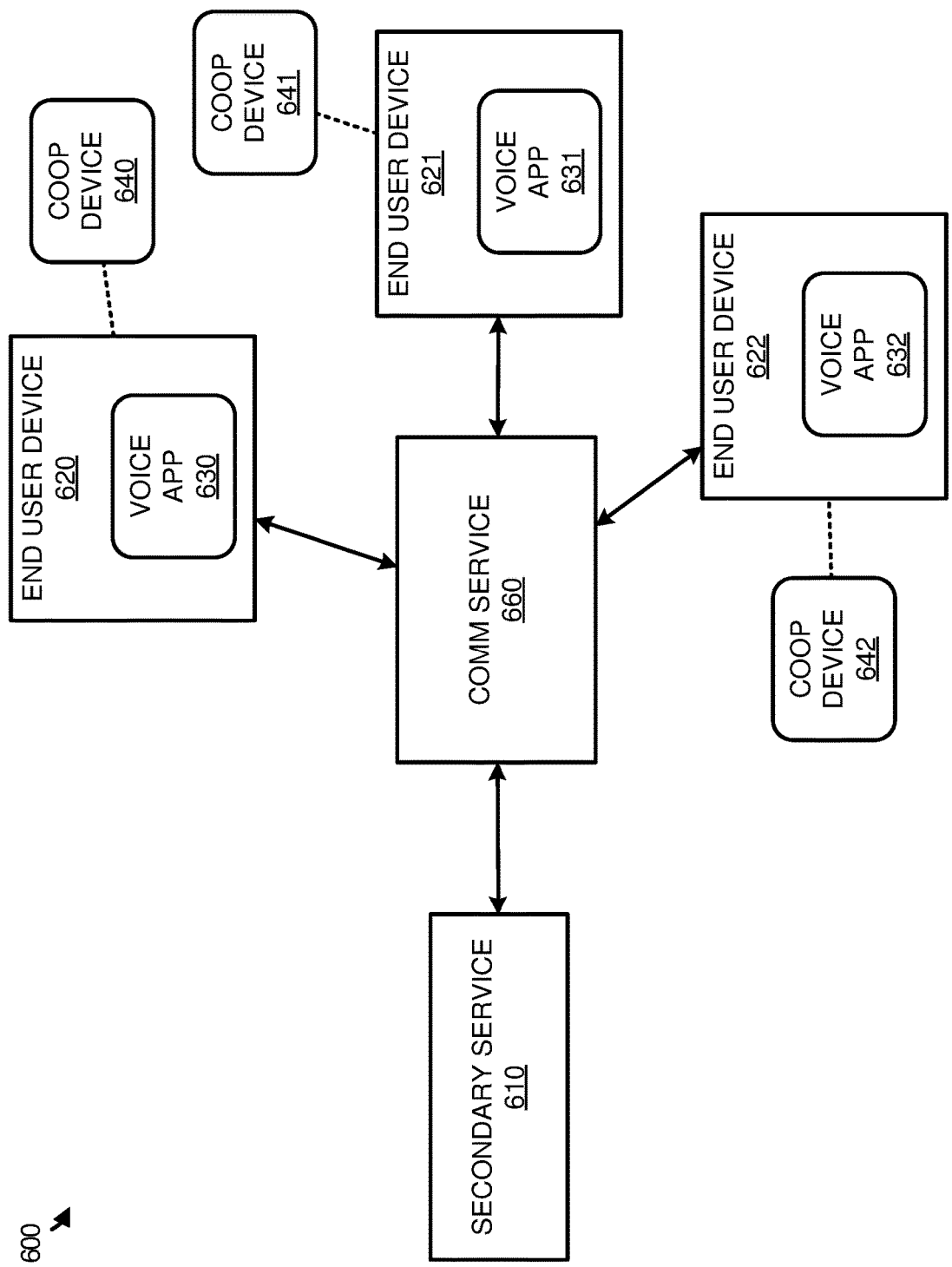
FIG. 6 illustrates a communication system for group communications according to one implementation.

FIG. 6 illustrates a communication system 600 for group communications according to one implementation. Communication system 600 includes similar elements to those provided in communication system 100 of FIG. 1, however, communication 600 further includes cooperating devices 640-642. In particular, communication system 600 includes secondary service 610, communication service 660, end user devices 620-622, and cooperating devices 640-642. Cooperating devices 640-642 wirelessly communicate with associated end user devices 620-622 and provide operations with respect to voice applications 630-632. Cooperating devices 640-642 may include a transmitter/receiver, a user interface to select transmit or receive mode, a microphone, a speaker, a processor, and any other similar element to communicate with the end user devices 620-622 and provide PTT operations for voice application 630-632. In some implementations, cooperating devices 640-642 may communicate with end user devices 620-622 using Bluetooth or other similar close range wireless technology, and may comprise a wearable device for the user associated with the end user devices.

As described herein, communication service 660 provides a platform for groups of users at multiple devices to communicate, such as the group of users represented by end user devices 620-622. To provide the communications, each of the end user devices, which may comprise a wireless phone, a tablet, a computer, or some other similar end user device, includes voice application 630-632, which is paired with and can communicate with cooperating devices 640-642. When a communication is desired, a user at a cooperating device, such as cooperating device 640, may use the user interface on the cooperating device to select transmit mode, wherein the microphone at the device will become active and receive the voice communication from the user. The cooperating device will forward the communication to end user device 620, and voice application 630 may forward the communication to communication service 660, which is used to distribute the voice communication as required.

In the present example, communication service 660 is configured to determine whether the voice communication includes a key phrase and, if the communication includes the key phrase, forward the communication to secondary service 610. This key phrase may include one or more words or sounds that request the communication be forwarded to secondary service 610. For example, a communication received at cooperating device 640 may be received in the following format, "secondary service ID, CONTENT OF COMMUNICATION." Once the communication is forwarded by end user device 620 to communication service 660, communication service 660 will identify the second service ID, and forward the communication to the second service based on this ID.

In some implementations, the key phrase from the voice applications may identify whether the communication to secondary service 610 corresponds to a group request or an individual request. Based on whether the request is a group request or an individual request, communication service 660 may include an identifier with the forwarded communication to indicate the profile the communication should be processed with. This permits secondary service 610 to provide the operations with the desired group of users, and further permits each user to address either an individual profile or a group profile from within the same voice communication application.

In some examples, based on a determination of whether a voice communication is directed at a group or an individual request, communication service 660 may forward or prevent forwarding of the communication. In particular, if the communication is directed at a request for an individual, then communication service 660 may prevent the communication from forwarding the communication to other devices within the communication group. For example, if a communication was received from end user device 620 and cooperating device 640 indicating a request for the individual user of end user device 620, then communication service 660 may prevent the communication from being forwarded to the other end user devices 621-622 in the communication group. In contrast, if the communication is directed at a request for the group, then communication service 660 may be configured such that the communication is forwarded to other members of the group. Thus, as an example, when a request is received from end user device 620 and cooperating device 640 indicating a request for the group to secondary service 610, then the communication may be forwarded to the other end user devices in the group as well as secondary service 610.

Although provided above as two examples of determining which group should receive communications when the secondary service is invoked, it should be understood that other configurations are possible and are in the scope of the present application. These alternative configurations may include identifying that the voice communication is directed at a subset of a particular group, or that the voice communication is directed at another particular user in the voice communication.

In some implementations, communication service 660 may also be configured to receive a response from secondary service 610. This response may include a verification that the voice communication provided a particular operation, a secondary follow-up question for the user making the request, or some other similar response. Accordingly, communication service 660 may be configured to direct the response to appropriated end user devices in end user devices 620. In some implementations, when the request from a particular end user device corresponds to an individual inquiry to secondary service 660, communication service 660 may only provide responses from secondary service 610 to the requesting end user device. In contrast, if a request corresponds to the group, communication service 660 may forward any return communication to all of the end user devices.

Figure 7:
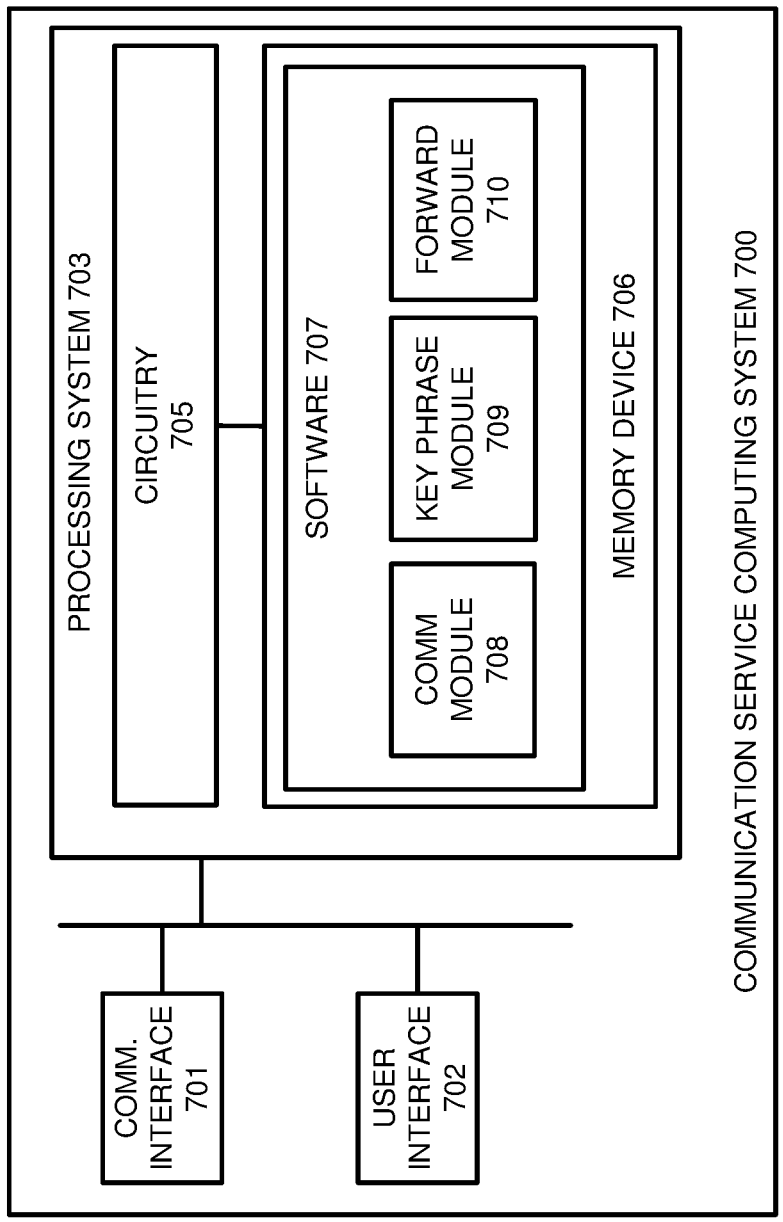
FIG. 7 illustrates a communication service computing system according to one implementation.

FIG. 7 illustrates a communication service computing system 700 according to one implementation. Computing system 700 is representative of any computing system or systems with which the various operational architectures, processes, scenarios, and sequences disclosed herein for providing a communication service may be implemented. Computing system 700 is an example of communication service 160 or communication service 660, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity. Computing system 700 may comprise a server, a user device, a desktop computer, a laptop computer, a tablet computing device, or some other user communication apparatus.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 is configured to communicate end user devices that use a group communication application, wherein the communication interface is used to transfer and receive voice communications for the devices in a particular communication group. Further, communication interface 701 may interface with a secondary service, wherein the secondary service may comprise a shopping service, a concierge service, a food ordering service, or some other similar service that can be accessed via a voice command in the voice communication application.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes communication module 708, key phrase module 709, and forward module 710, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, communication module 708, when read and executed by processing system 703, directs processing system 703 to exchange voice communications for end user devices that belong to a communication group. This group may comprise individuals of an organization, a subset of individuals from an organization, a group of friends, or some other similar group of individual users. In some examples, the voice communications may comprise PTT communications, wherein each of the users is capable of using a user interface to change from transmitting to receiving mode.

During the communications, key phrase module 709 directs processing system 703 to identify a voice communication from one of the end user devices in the group communication that invokes a secondary service, wherein invoking the second service may include the identification of a defined phrase. Once a communication is identified with a key phrase, forward module 710 directs processing system 703 to forward at least a portion of the identified voice communication to the associated secondary service.

In some implementations, key phrase module 709 may further direct processing system 703 to perform operations to determine whether the key phrase provided in a communication is directed at a request for the group of users in the communication group or is directed at only the individual of the communication group. Based on the determination, key phrase module 709 may add an identifier to the communication transferred to the secondary service indicating the user or group associated with the request, and may further limit the forwarding to other end users if the request is for the individual or only a subset of the overall group.

Returning to the elements of FIG. 1, messaging assistance service 110 and communication service 160 can include communication interfaces, network interfaces, processing systems, computer systems, microprocessors, storage systems, storage media, or some other processing devices or software systems, and can be distributed among multiple devices. Examples of messaging assistance service 110 and communication service 160 can include software such as an operating system, logs, databases, utilities, drivers, natural language processing software, networking software, and other software stored on a computer-readable medium. Messaging assistance service 110 and communication service 160 may comprise, in some examples, one or more server computing systems, desktop computing systems, laptop computing systems, or any other computing system, including combinations thereof.

End user devices 120-122 can each be a user device, subscriber equipment, customer equipment, access terminal, smartphone, personal digital assistant (PDA), computer, tablet computing device, e-book, Internet appliance, media player, game console, or some other user communication apparatus, including combinations thereof. End user devices 120-122 can each include communication interfaces, network interfaces, processing systems, computer systems, microprocessors, storage systems, storage media, or some other processing devices or software systems.

Communication links 150-153 each use metal, glass, optical, air, space, or some other material as the transport media. Communication links 150-153 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 150-153 can each be a direct link or can include intermediate networks, systems, or devices, and can include a logical network link transported over multiple physical links. Although one main link for each of links 150-153 is shown in FIG. 1, it should be understood that links 150-153 are merely illustrative to show communication modes or access pathways. In other examples, further links can be shown, with portions of the further links shared and used for different communication sessions or different content types, among other configurations. Communication links 150-153 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   operating a group communication service that facilitates voice communications between a group of end user devices, including:
   identifying, in a voice communication from a first end user device from the group of end user devices, a service request based on a use of a key phrase identifying a secondary service;
   determining, based on the key phrase, which of:
   1) a plurality of end user devices in the group of end user devices, and
   2) only the first end user device,
   the service request is associated with; and
   in response to identifying the key phrase, forwarding at least a portion of the voice communication to the secondary service along with an identifier for the determined plurality of end user devices or first end user device.

2. The method of claim 1 wherein the voice communications comprise push-to-talk communications.

3. The method of claim 1 wherein at least one end user device in the group of end user devices is wirelessly coupled to a cooperating device capable of receiving and playing the voice communications.

4. The method of claim 1 further comprising, in response to determining the service request is associated with only the first end user device, not forwarding the voice communication to other end user devices in the group of end user devices.

5. The method of claim 1 further comprising:
   based on determining the service request is associated with the plurality of end user devices, determining the identifier to be a group profile associated with the plurality of end user devices; and
   based on determining the service request is associated with only the first end user device, determining the identifier to be a user profile associated with a user of the first end user device.

6. The method of claim 1 further comprising:
   in response to determining the service request is associated with the plurality of end user devices, transferring the voice communication to the plurality of end user devices.

7. The method of claim 1 further comprising:
   receiving an audio response from the secondary service;
   transferring the audio response to the first end user device if the service request was associated with only the first end user device; and
   transferring the audio response to the plurality of end user devices if the service request was associated with the plurality of end user devices.

8. The method of claim 1 wherein the plurality of end user devices is a subset fewer than all of the end user devices in the group of end user devices.

9. The method of claim 1 wherein the group of end user devices comprise a group of wireless communication devices.

10. A memory device storing instructions which, when executed, cause a processing system to:
    operate a group communication service that manages voice communications between a group of end user devices, including:

identifying, in a voice communication from a first end user device from the group of end user devices, a service request based on a use of a key phrase identifying a secondary service;

in response to identifying the key phrase, forwarding at least a portion of the voice communication to the secondary service; and in response to determining the service request is associated with only the first end user device, not forwarding the voice communication to other end user devices in the group of end user devices.

11. The memory device of claim 10 wherein the voice communications comprise push-to-talk communications.

12. The memory device of claim 10 wherein at least one end user device in the group of end user devices is wirelessly coupled to a cooperating device capable of receiving and playing the voice communications.

13. The memory device of claim 10 wherein the instructions further cause the processing system to:

determine, based on the key phrase, which of:
1) a group profile for the group of end user devices, and
2) a user profile for a user of the first end user device, the service request is associated with; and forwarding the at least a portion of the voice communication to the secondary service along with an identifier for the determined group profile or user profile.

14. The memory device of claim 13 wherein the instructions further cause the processing system to:

in response to determining the service request is associated with the group profile, transfer the voice communication to a plurality of end user devices in the group of end user devices.

15. The memory device of claim 13 wherein the instructions further cause the processing system to:

receive an audio response from the secondary service;
transfer the audio response to the first end user device when the service request was associated with the user profile; and
transfer the audio response to the group of end user devices if the service request was associated with the group profile.

16. The memory device of claim 13 wherein the group profile is associated with a plurality of end user devices fewer than all the end user devices in the group of end user devices.

17. The memory device of claim 10 wherein the group of end user devices comprise a group of wireless communication devices.

18. An apparatus comprising:

a processor configured to operate a group communication service that controls voice communications between a group of end user devices, operating the group communication service including:

identify, in a voice communication from a first end user device from the group of end user devices, a service request based on a use of a key phrase identifying a secondary service;

determine, based on the key phrase, which of:
1) a plurality of end user devices in the group of end user devices, and
2) only the first end user device,
the service request is associated with; and in response to identifying the key phrase, forward at least a portion of the voice communication to the secondary service along with an identifier for the determined plurality of end user devices or first end user device.

19. The apparatus of claim 18 wherein the processor is further configured to:

in response to determining the service request is associated with only the first end user device, not forward the voice communication to other end user devices in the group of end user devices.

20. The apparatus of claim 18 wherein the processor is further configured to:

receive an audio response from the secondary service;
transfer the audio response to the first end user device when the service request was associated with only the first end user device; and
transfer the audio response to the plurality of end user devices when the service request was associated with the plurality of end user devices.

* * * * *